United States Patent [19]

Maurer et al.

[11] Patent Number: 4,856,411
[45] Date of Patent: Aug. 15, 1989

[54] OVERLOAD RELEASE SYSTEM FOR AN AXIALLY MOVABLE BOLT

[75] Inventors: Ruprecht Maurer; Karlheinz Timtner, both of Bad Homburg, Fed. Rep. of Germany

[73] Assignee: Ringspann Albrecht Maurer KG, Bad Homburg, Fed. Rep. of Germany

[21] Appl. No.: 26,867

[22] Filed: Mar. 17, 1987

[30] Foreign Application Priority Data

Apr. 7, 1986 [DE] Fed. Rep. of Germany ....... 3611617

[51] Int. Cl.$^4$ .......................... F01B 25/26; F15B 15/26
[52] U.S. Cl. ............................................. 91/1; 92/5 L; 92/27; 92/28; 92/30
[58] Field of Search ....................... 92/5 L, 14, 23, 27, 92/28, 30, 5 R

[56] References Cited

U.S. PATENT DOCUMENTS

| | | | |
|---|---|---|---|
| 1,248,861 | 12/1917 | Holloway | 92/23 |
| 3,180,234 | 4/1965 | Crawley | 92/5 L |
| 3,665,813 | 5/1972 | Loveless | 92/30 |
| 4,248,138 | 2/1981 | Akkerman | 92/27 |
| 4,392,556 | 7/1983 | Deutsch | 92/23 |

FOREIGN PATENT DOCUMENTS

| | | |
|---|---|---|
| 0156993 | 10/1985 | European Pat. Off. . |
| 2212753 | 9/1973 | Fed. Rep. of Germany . |
| 2216776 | 10/1973 | Fed. Rep. of Germany .......... 92/27 |
| 2453500 | 5/1976 | Fed. Rep. of Germany . |
| 8521114 | 11/1985 | Fed. Rep. of Germany . |
| 3502774 | 10/1986 | Fed. Rep. of Germany . |
| 14669 | 5/1956 | German Democratic Rep. . |

*Primary Examiner*—Edward K. Look
*Attorney, Agent, or Firm*—Frishauf, Holtz, Goodman & Woodward

[57] ABSTRACT

An apparatus is proposed for releasably locking a bolt in the axial direction relative to a housing element surrounding it, in which the bolt has a circumferential groove tapering radially inward and a locking element inserted into this groove with a cross section adapted to that of the groove. The locking element protrudes radially beyond the cross section of the bolt and is in contact there on both sides with support surfaces, one of which is formed by the housing and the other of which is axially displacable under a compressive force load; at least one of these support surfaces is inclined, to provide a radially outwardly oriented reduction of the cross section formed between the support surfaces.

18 Claims, 4 Drawing Sheets

OVERLOAD RELEASE SYSTEM FOR AN AXIALLY MOVABLE BOLT

The present invention relates to apparatus for releasably retaining an axially movable bolt, the bolt being retained under normal loading conditions but permitted to move axially under overload conditions to prevent, for example, damage to apparatus connected to the bolt and the bolt housing, respectively.

BACKGROUND

There are numerous applications in which highly loaded, or stressed parts of a machine, apparatus or the like must be protected against load-induced breakage or other kind of destruction or impairment. To do so, it is typically provided that the parts to be protected are interrupted and at the interruption are connected together transverse to the force direction of the power flux by so-called shear pins or bolts, which are sheared off when there is an overload, so that the power flux is interrupted.

To name some examples, a connecting rod located in a force transmitting apparatus would bend out of alignment under an overload if it were not secured against overload by suitable means. Similarly, the machine head that supports the working force in a press would tear off from the machine frame if overloaded. The bars securing a snowplow would bend and buckle or break if the snowplow were not connected to these bars with an intervening overload protector.

Overload protectors in the form of shear bolts have the disadvantage, however, that once they have sheared off, in performing their task as overload protectors, and have thereby become unusable, the bolts must be replaced, which often is very tedious and labor-intensive. The aforementioned known overload protectors accordingly have the disadvantage that they are themselves destroyed and therefore cannot be reused.

THE INVENTION

It is an object to provide an arrangement of the type described, without, however, causing destruction to the overload element, so that an overload coupling system is provided which can be re-connected after the overload has been removed; and, preferably, also to include an indicating arrangement to indicate that an overload condition occurred. Preferably, resetting of the bolt, after an overload condition has been removed, should also be provided for in a simple and easily arranged manner.

Briefly, the bolt is formed with a circumferential groove which has a generally wedge-shaped cross section, narrowing or tapering in the direction toward the central axis of the bolt. At least one radially outwardly movable locking arrangement or element is located in the groove. The locking arrangement or element may be part-segmental in form, a plurality of balls or the like. The locking element has a cross section which also tapers or decreases from a wider dimension towards the center axis. An axially movable support element is located radially adjacent the groove of the bolt, and defines a radially extending support surface; the support element is subjected to a biassing force, for example a spring, fluid pressure force or the like, which will be applied against a portion of the radially movable locking element. The radially movable locking element is, additionally, supported by a counter surface, opposite the support surface, and formed on the housing element or placed thereadjacent, axially close or adjacent the groove. The locking element is retained in the groove and supported against the biassing force by the counter surface. At least one of the side surfaces, that is, the counter surface or the support surface, or both, are conically shaped with a theroretical cone apex located at least approximately on the central axis of the bolt and having the cone surface placed in the direction with the wider portion of the cone towards the other side surface to define a hollow essentially conical surface which is in engagement with a side of the at least one locking element.

Ordinarily, and in accordance with a preferred feature of the invention and depending on design conditions, the radial extent of the space defined between the support surface and the counter surface, and forming, in effect, a groove, should be at least as large, and possibly larger than the radial extent of the cross section of the respective at least one locking element or the locking elements.

By these means, a locking element for locking the bolt relative to the housing element surrounding it, which is equally effective in both axial directions of the bolt, is provided, which opens when a predeterminable axial load of the bolt is exceeded; the locking element is pressed radially outward by the action of the supporting flank of the groove, contrary to the exertion of force, until the bolt can slip radially inward through the locking element. The axial force effecting this unlocking is fixable, or predeterminable by computer, by means of the inclination of the flanks of the groove, the dimensions and adjustment of the force and the inclination of the support surface involved. Renewed locking of the bolt takes place by means of its movement in the opposite direction, until such time as the locking element is pressed back into the groove by the action of the compression spring and by the oblique position of the support surfaces.

The apparatus can be incorporated directly into the power flux that might have to be interrupted, parallel to the direction thereof. However, it may also act indirectly, for instance in that a wedge surface incorporated into the power flux brings about a force direction oriented toward the bolt, which is thus deflected with respect to the actual force direction.

Because the apparatus according to the invention is reusable, fastening elements on hand that are destroyed when the housing element to be protected is overloaded need no longer be kept on hand, and the extensive work of reestablishing the connection interrupted by the overload is no longer necessary.

In the simplest case, a plurality of balls can be located in the groove, distributed over the circumference of the bolt, to act as locking elements. For absorbing relatively great forces, however, it is suitable for the locking element to be a readially spreadable ring or a plurality of ring segments located in the groove distributed over the circumference of the bolt; in either case, the cross section of the locking element corresponds on the one hand to the cross section of the circumferential groove in the bolt and on the other hand to the cross section between the support surfaces.

In these latter forms of the locking element, it has also proved to be advantageous for the ratio of the axial width to the radial height of the cross-sectional part of the locking element that protrudes radially beyond the outer diameter of the bolt to be greater than 1.5 and preferably greater than 2.0. It is also suitable for the radial height of the cross-sectional part of the locking element that protrudes radially beyond the outer diameter of the bolt to be greater than the radial height of its cross-sectional part that protrudes into the circumferential groove of the bolt. This is particularly true for locking elements in the form of ring segments, to prevent their tilting about an axis that is transverse to the central axis of the bolt.

The locking element may be of metal or plastic, and bronze is suitably used as the metal in order to obtain favorable sliding friction properties relative to the material comprising the bolt and the support surfaces.

As already noted, any desired axial force at which the unlocking of the bolt relative to the housing element occurs can be defined in advance or calculated by the selection of the angle of inclination of the flanks of the groove, on the one hand, and of the support surfaces on the other, along with the force; the selection can certainly also be made such that the forces involved may be of different magnitudes in the two axial directions of the bolt. It has proved to be particulaly suitable, however, to design the system such that the bolt is unlockable from the locking element with an equal exertion of force in both axial directions.

In many cases, a compression spring suitably generates the the axial force required for the locking. In terms of the paring between the compression spring and the locking element, it is advantageous to provide an attached element between the compression spring and locking element, in the form of an axially displacably guided ring having the support surface. On the other hand, it is suitable for the compressive force of the compression spring to be adjustable, so that if needed a very accurate adjustment of the force at which the unlocking of the bolt takes place can be performed on site or with the aid of a force measuring device.

In other cases, however, it may be advantageous for the force acting upon the axially displacable support surface to be produced hydraulically or pneumatically and for this force to be adjustable by varying the pressure.

In a further feature of the invention it can be provided that radial movements of the locking element or axial movements of the bolt can be sensed by a position transducer, which may suitably be an approach sensing means or limit switch. This makes it possible, for instance, to shut the drive of a machine off even before the unlocking of the bolt takes place, making use of the fact that in the apparatus according to the invention the unlocking is not an abrupt event but rather a process of motion, which is completed only when the biasing of the compression spring increases and there is a corresponding radial movement of the locking element or axial movement of the bolt.

For example, the shutoff of the machine drive can then be done as soon as when such a movement on the part of the locking element or bolt begins, so that when the bolt is unlocked only the kinetic energy of the moving machine parts is operative, or so that bolt unlocking may not occur at all because a lack of driving force does not even bring about the overload state that is to be prevented. If the function of the system according to the invention is to be limited to this last instance, then it may be advantageous and even sufficient for the radial extension of the cross section of the ring groove formed by the two support surfaces to be smaller than the radial extension of the locking element.

Finally, in another feature of the invention it may be suitable for a piston element to be disposed on the bolt beside the locking device, for the housing element to have a cylinder receiving the piston element in an axially displacable manner within it, and for the cylinder to be subjectable to pressure fluid on both ends of the piston. In this way, not only can a re-establishment of the locking between the bolt and the housing element be brought about, for example under remote control, but an intentional unlocking of the bolt can also be effective, for example by providing that at some machine location remote from the apparatus according to the invention an overload status is ascertained by suitable means, and the interruption of a power flux can then be brought about by unlocking the bolt.

Further features and details of the invention will become apparent from the ensuing description of exemplary embodiments shown in the drawing.

DRAWINGS

DETAILED DESCRIPTION

Figure 1:
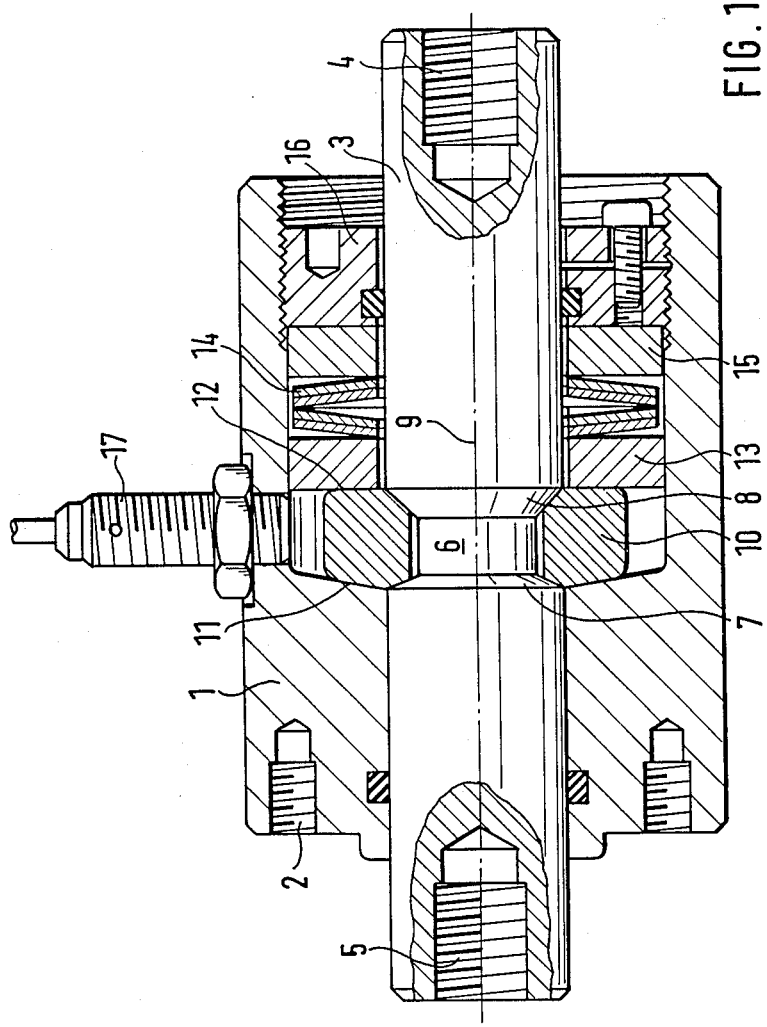
FIG. 1 is a schematic radial cross section through an apparatus for releasably retaining a bolt, permitting axial movement under overload conditions.

FIG. 1 shows a housing 1, which is attached in stationary fashion via screw means 2. A cylindrical bolt 3 is axially displacably guided in the housing 1, and axial forces can be introduced into this bolt via threaded bores 4, 5.

The bolt has a circumferential groove 6, the cross section of which tapers toward the center axis 9 of the bolt, forming inclined smooth flanks 7, 8. In the circumferential groove 6, a locking element 10 is inserted, for example in the form of a slit and hence radially spreadable ring or in the form of a plurality of ring segments distributed over the circumference of the bolt 3; the radially inner cross-sectional region of this locking element corresponds to the cross section of the groove 6. The radially outer cross-sectional region of the locking element 10 is adapted to the axial cross section formed between a support surface 11 of the housing 1, on the one hand, and a support surface 12 of a ring 13 that is axially displacable in the housing 1, on the other. The ring 13 is urged in the direction toward the locking element 10 by a compression spring 14, which is supported via an intermediate ring 15 on an annular disc 16 that is adjustable by screw threads in the housing element 1; the adjustment by screw threads by this disc 16 is a means of adjusting the biassing compressive force of the compression spring 14.

FIG. 1 shows the system described, in a state where the bolt 3 is locked in the axial direction relative to the housing 1, this locking being imposed by the fact that under the influence of the compression spring 14 and of the oblique position, relative to the radial direction, of the support surface 11, the locking element 10 is radially pressed into the groove 6. If the bolt 3 is now subjected to a particular axial load, for example directed toward the right, then the locking element 10 slides radially outward on the flank 7 of the groove 6 counter to the action of the spring 14, until such time as the bolt 3 can slide freely through the then correspondingly radially widened bore of the locking element 10, the bolt 3 thereby becoming unlocked relative to the housing element 1 without having to be subjected to a restoring force. Although the locking element 10 is loaded, in the sense that it undergoes a radial reduction of its cross section under the influence of the compression spring 14 and support surface 11, it rests when so loaded on the smooth cylindrical shaft of the bolt 3, without the bolt 3 having to be subjected to an axial force.

An axial load of the bolt 3 directed toward the left in the drawing has the same result, but if the unlocking is to take place at an axial force of equal magnitude, then the flank 8 is provided with a flatter inclination relative to the axial direction 9 than the flank 7, because in this case the action of the compression spring 14 participates in the opposite direction in terms of the axial load of the bolt 3.

As is apparent from the drawing, the cross-sectional portion of the locking element 10 that protrudes radially beyond the bolt 3 has a larger radial extension than the portion of the cross section that is seated in the groove 6. This embodiment is selected in order to impart sufficient security against tilting, in terms of rotation about an axis at right angles to the axis 9, to the locking element 10, which may optionally comprise a plurality of ring segments. For example, the locking element 10 is pressure-loaded against the support surface 12 via the flank 7, so that for the cross section of the locking element located above the axis 9 there is a resultant torque load that is oriented counterclockwise, but this load is absorbed by the large area of contact of the locking element 10 on the ring 13.

FIG. 1, finally, shows an approach sensing switch 17 secured in the housing element 1. This switch enables sensing of the radial motions of the locking element 10 and their conversion into a signal by means of which a machine drive can for instance be shut off.

Figure 2:
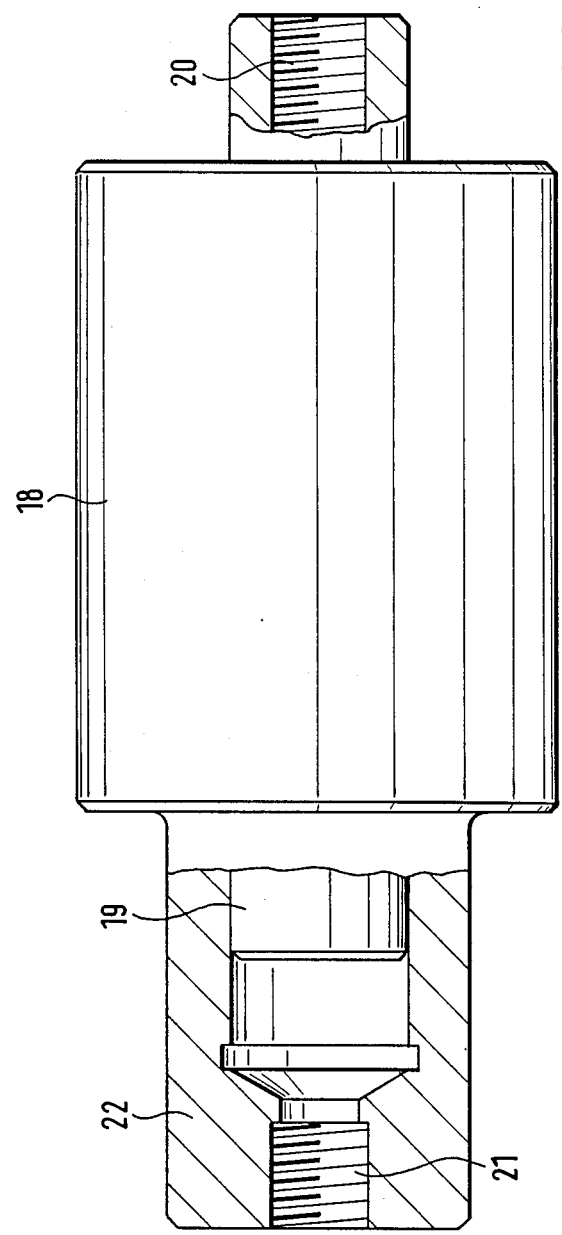
FIG. 2 is a general side view of the apparatus, partly in section, and illustrating another embodiment.

FIG. 2, in a partly sectional side view, shows a housing 18, comparable to the housing 1, in which a bolt 19 is axially displacable; however, this bolt protrudes beyond the housing 18 only with its right-hand end, while its left-hand end, as shown in section, is captive in the housing. Unlike FIG. 1, for example, the introduction of axial force here is effected on the right-hand side via a threaded bore 20 of the bolt 19 and on the left-hand side via a threaded bore 21 of a housing extension 22 that receives the left-hand end of the bolt. Otherwise the details in the interior of the housing 18, not shown here, are equivalent to the embodiment shown in FIG. 1.

Figure 3:
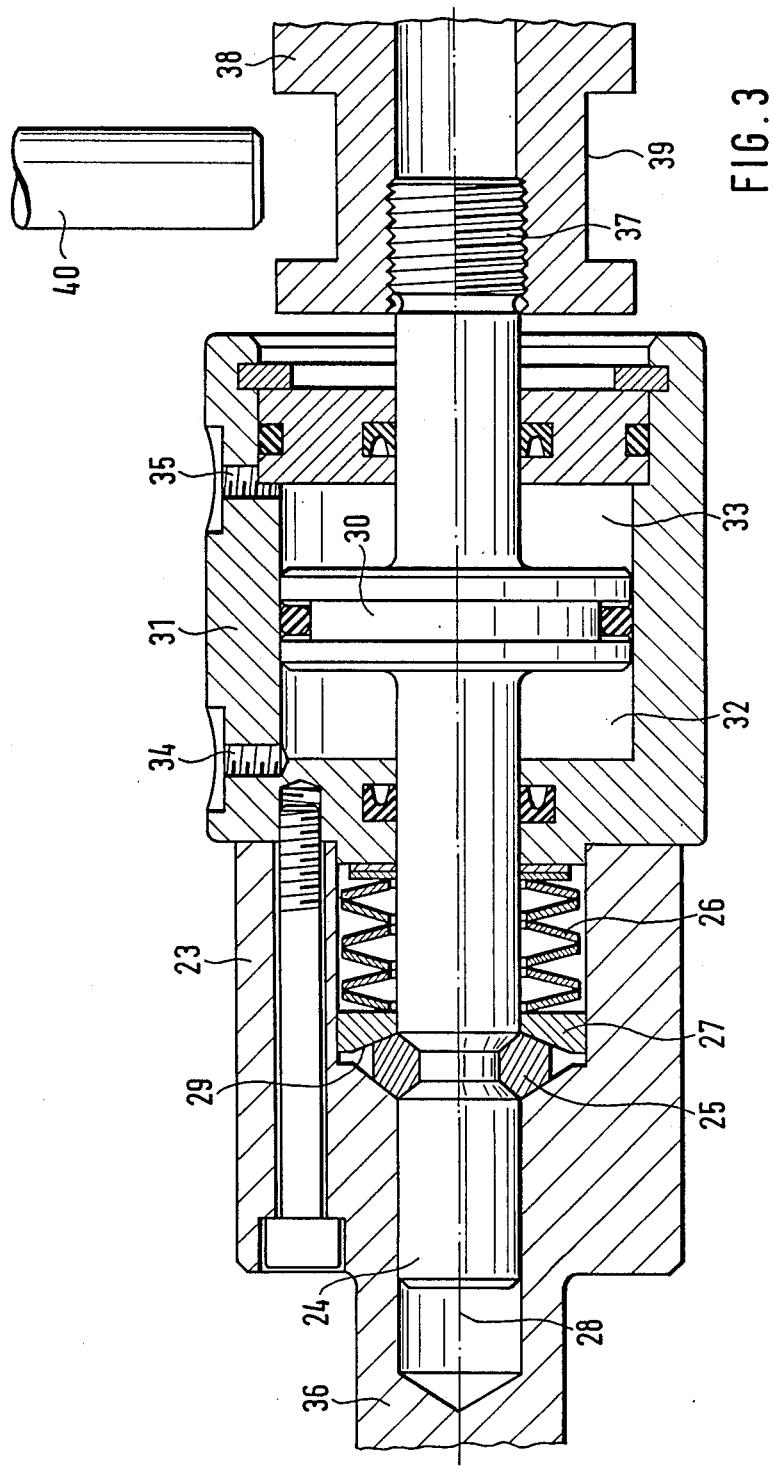
FIG. 3 is a radial sectional view, illustrating yet another embodiment.

FIG. 3 is an axial section of an expanded embodiment of the apparatus already shown in detail in FIGS. 1 and 2.

Once again, a housing 23 is visible in which a bolt 24 is axially displacable and is locked in a releasable manner by the means described in greater detail in conjunction with FIG. 1. The only difference is that in FIG. 3 the ring 27 located between the locking element 25 and compression spring 26 has a support surface 29 extending obliquely with respect to the radial direction toward the bolt axis 28, which may be suitable for particular circumstances.

Furthermore, however, the bolt 24 has a piston element 30, which is displacable in a cylinder 31 that is closed at both ends and communicates with the housing 23; the cylinder spaces 32 and 33 thus formed at either end of the piston element 30 can be subjected to pressure fluid via bores 34 and 35. This additional arrangement offers the opportunity, when the bolt 24 has been unlocked by motion to the right or left relative to the housing element 23, of relocking it relative to the housing, for example under remote control, by subjecting the appropriate cylinder chamber 32 or 33 to pressure medium and axially displacing the bolt 24 accordingly. In the same manner, this additional arrangement offers the opportunity of unlocking the bolt 24 intentionally by the suitable imposition of pressure medium upon the piston element 30.

Similarly to the embodiment of FIG. 2, here again it is possible to induce axial force on the left-hand side via an extension 36 of the housing element 23 and on the right-hand side via the bolt end 37 protruding beyond the cylinder 31, with an adjoining machine element 38 being screwed to this end 37 of the bolt in the present case. This machine element has a circumferential groove 39, with which an approach sensing switch 40 corresponds; upon axial movement of the bolt 24 and thus of the housing element 38, this switch 40 emits a signal with which the drive of a machine in which the apparatus according to FIG. 3 is installed can for instance be shut off.

In FIGS. 1 and 3, the locking element 10 or 25 is a radially spreadable ring or an arrangement of ring segments of the cross section shown. In simpler cases, however, balls can also be provided for this purpose, which in the manner shown cooperate with the flanks of the bolt groove or support surfaces of the housing and of the ring acted upon by the compression spring.

Figure 7:
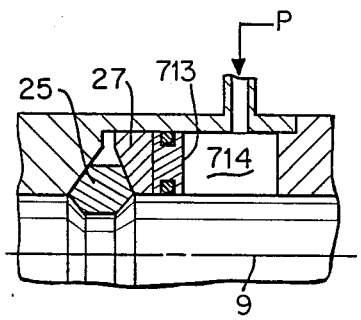
FIG. 7 is a fragmentary, part-cross-sectional view illustrating application of biassing force in form of a fluid pressure medium.

Biasing force need not be applied by a spring 14; as seen in FIG. 7, biasing force may be applied by a piston-cylinder arrangement. A slidable piston 713 formed with a groove to retain a sealing ring therein, is engaged against a part-conical element 27 (FIG. 3). Upon application of fluid pressure, for example hydraulic pressure as schematically indicated by the arrow P into a cylinder 714 formed in the housing, force will be applied against the wedge-shaped element 27, similar to application by the spring 26 against element 27, see FIG. 3.

Figure 4:
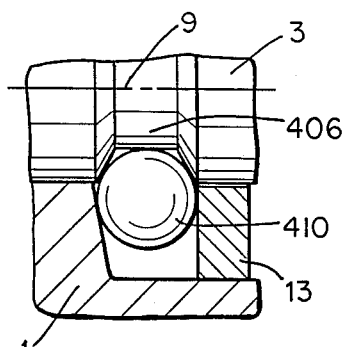
FIG. 4 is a fragmentary, part cross-sectional view, illustrating locking elements formed as balls.
Figure 5:
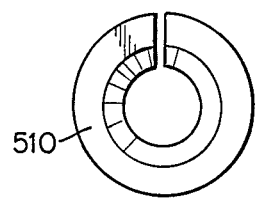
FIG. 5 is a plan view of a split-ring locking element.
Figure 6:
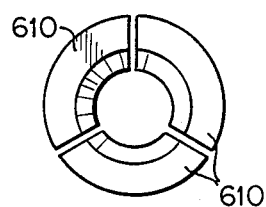
FIG. 6 is a plan view of segmental locking elements.

The locking elements may be balls 410 - see FIG. 4 -movable in a groove 406 of the bolt 3, which may have a groove which is conical or rounded to receive the balls. Alternatively, radially movable segments 610, FIG. 6, may be provided or a single split ring 510 - see FIG. 5.

Various changes and modifications may be made, and features described in connection with any one of the embodiments may be used with any of the others, within the scope of the inventive concept.

We claim:

1. System for axially releasably retaining a bolt (3,19, 24) while permitting the bolt to move freely under overload conditions in a bore of a housing element (1) in either axial direction, comprising,
    a circumferential groove (6) formed in the bolt, said groove having a wedge-shaped cross-section tapering in a direction towards a central axis (9) of the bolt;
    at least one radially movable locking element (10,25; 410, 510, 610) located in said groove and having a cross-section which tapers from a wider dimension to a narrower dimension towards said central axis;

an axially movable support element (13, 27) having a support surface (12, 29) which extends radially and is located adjacent the groove of the bolt;

means (14, 26, 713, 714), supported on said housing element, for applying a biassing force to said support element and thereby defining an overload release limit;

a radially extending counter surface (11) terminating the housing element axially adjacent the groove, said at least one locking element being retained in said groove and being supported against said biassing force by said counter surface, and wherein at least one of said surfaces (11, 12, 29) is a conical surface having a theoretical cone apex located at least with the wider portion of the conical surface towards the other of said surfaces to define a hollow cone surface which is in engagement with said at least one locking element, said locking element being radially movable along one of said surfaces, against said biassing force, and out of said circumferential groove (6) in response to axial loading of said bolt, as transmitted at a surface of said wedge-shaped groove (6), thereby releasing said bolt (3) and rendering it axially movable and free of axial restoring forces.

2. The system of claim 1, wherein said support surface and said counter surface define a ring space; and wherein the radial extent of said ring space is at least as large as the radial extent of the at least one locking element.

3. The system of claim 1, wherein (FIG. 4) the at least one locking element comprises a plurality of balls (410) positioned circumferentially in said groove (406).

4. The system of claim 1, wherein (FIG. 5) the at least one locking element comprises a radially expandable ring element (510) having a ring cross section which corresponds and matches, at least approximately, the cross section of the circumferential groove (6) in the bolt and the cross section of the space defined between the support surface and the counter surface.

5. The system of claim 1, wherein (FIG. 6) the at least one locking/element comprises a plurality of ring segments (610) distributed within the groove (6), the cross section of the ring segments conforming and matching, at least approximately, the cross section of the groove (6) in the bolt and the space defined between the support surface and the counter surface.

6. The system of claim 4, wherein the ratio of the axial width to the radial height of the portion of the cross section radially extending beyond the outer diameter of the bolt (3, 19, 24) is larger than 1.5.

7. The system of claim 5, wherein the ratio of the axial width to the radial height of the portion of the cross section radially extending beyond the outer diameter of the bolt (3, 19, 24) is larger than 1.5.

8. The system of claim 1, wherein the radial extent of the portion of the at least one locking element extending beyond the outer diameter of the bolt is greater than the radial extent of the cross-sectional portion of the at least one locking element extending within the circumferential groove (6) of the bolt (3, 19, 24).

9. The system of claim 1, wherein the at least one locking element comprises metal or plastic.

10. The system of claim 1, wherein the angle of the flanks defining the groove (6) within the bolt are different and differ from each other such that the force with which the bolt can be released upon axial movement of the at least one locking element will be the same regardless of the axial direction of movement of the bolt.

11. The system of claim 1, wherein the means for applying a biassing force comprises a spring (14, 26).

12. The system of claim 11, further including a ring element (13, 27) positioned between said spring (14, 26) and said locking element (10, 25) carrying said axially movable support surface.

13. The system of claim 11, wherein the compressive force of said spring is adjustable.

14. The system of claim 1, wherein (FIG. 7) said means for applying a biassing force comprises fluid pressure means (713, 714, P), and wherein the fluid pressure force is adjustable.

15. The system of claim 1, further including position sensing means (17, 40) sensing movement of at least one of: said at least one locking element (10); said bolt (24).

16. The system of claim 15, wherein the position sensing means includes an approach sensing or a limit switch (17, 40).

17. The system of claim 1, further including a piston element (30) coupled to the bolt;

the housing element forming a counter surface for said bias force application means and including a cylinder (31) within which the piston is axially movable;

and means for applying, selectively, a pressure fluid to both sides of the piston.

18. The system of claim 1, wherein the radial extent of the cross section of the space defined by the support surface and the counter surface is less than the entire radial extent of the at least one radially movable locking element.

* * * * *